United States Patent
Sakai et al.

(10) Patent No.: US 10,728,411 B2
(45) Date of Patent: Jul. 28, 2020

(54) IMAGE PROCESSING APPARATUS WITH COMMUNICATION PATH SWITCH TO SWITCH COMMUNICATION PATHS BETWEEN CONTROLLERS

(71) Applicant: BROTHER KOGYO KABUSHIKI KAISHA, Nagoya-shi, Aichi-ken (JP)

(72) Inventors: Katsunori Sakai, Toyokawa (JP); Takayuki Suzuki, Gifu (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 16/283,969

(22) Filed: Feb. 25, 2019

(65) Prior Publication Data
US 2019/0268493 A1 Aug. 29, 2019

(30) Foreign Application Priority Data
Feb. 26, 2018 (JP) ................................. 2018-032595

(51) Int. Cl.
H04N 1/00 (2006.01)
(52) U.S. Cl.
CPC ..... *H04N 1/00907* (2013.01); *H04N 1/00888* (2013.01)
(58) Field of Classification Search
None
See application file for complete search history.

(56) References Cited

U.S. PATENT DOCUMENTS

| 2015/0264208 A1* | 9/2015 | Achiwa | H04N 1/00885 358/1.15 |
| 2016/0337540 A1* | 11/2016 | Fujisawa | H04N 1/00891 |

FOREIGN PATENT DOCUMENTS

JP 2015-174373 A 10/2015

* cited by examiner

*Primary Examiner* — Andrew H Lam
(74) *Attorney, Agent, or Firm* — Scully Scott Murphy and Presser

(57) ABSTRACT

An image processing apparatus includes: a power supply; a first interface; a first controller configured to control communication with the external device via the first interface, the communication including communication relating to image data and communication relating to power exchange to and from the external device; a second controller configured to control power fed from the power supply to the external device connected to the first interface, based on information obtained by the communication relating to power exchange to and from the external device; and a first path switch configured to: form a first communication path connecting the first controller and the first interface in a first power mode; and form a second communication path connecting the second controller and the first interface without via the first controller in a second power mode.

15 Claims, 7 Drawing Sheets

IMAGE PROCESSING APPARATUS WITH COMMUNICATION PATH SWITCH TO SWITCH COMMUNICATION PATHS BETWEEN CONTROLLERS

CROSS-REFERENCE TO RELATED APPLICATION

This application claims priority from Japanese Patent Application No. 2018-032595 filed on Feb. 26, 2018, the entire subject-matter of which is incorporated herein by reference.

TECHNICAL FIELD

The disclosure relates to an image processing apparatus.

BACKGROUND

An image processing apparatus such as an MFP (Multi-Function Peripheral) is usually provided with a normal mode in which operating power is fed to each unit and a power saving mode in which the feeding of the operating power to a reading unit configured to read an image, and the like is stopped. For example, when a state in which an operation of each unit is stopped continues for a predetermined time in the normal mode, the image processing apparatus shifts from the normal mode to the power saving mode for saving the power.

There is an image processing apparatus having a USB (Universal Serial Bus) interface, as one of interfaces with an external device. The USB interface enables not only data communication between devices but also power feeding to a power feeding target device such as a smart phone, a tablet and the like. In recent years, the power of maximum 100 W can be fed from the USB interface to the power feeding target device, in accordance with a USB power delivery standard. The image processing apparatus conforming to the USB power delivery USB standard has a PD controller configured to control an amount of power to be fed from the USB interface.

In the normal mode, since the operating power is fed to each unit of the image processing apparatus, when the power feeding target device is connected to the USB interface, the PD controller performs necessary communication with the device connected to the USB interface through a CPU, so that the power is fed to the device. However, when the image processing apparatus is in the power saving mode at the time that the power feeding target device is connected to the USB interface, if the feeding of the operating power to the CPU is stopped, the PD controller cannot perform necessary communication with the device connected to the USB interface and feed the power to the device.

SUMMARY

Illustrative aspects of the disclosure to provide an image processing apparatus capable of more securely performing communication relating to power exchange to and from an external device.

One illustrative aspect of the disclosure may provide an image processing apparatus comprising: a power supply; a first interface; a first controller configured to control communication with the external device via the first interface, the communication comprising communication relating to image data and communication relating to power exchange to and from the external device; a second controller configured to control power fed from the power supply to the external device connected to the first interface, based on information obtained by the communication relating to power exchange to and from the external device; and a first path switch configured to: form a first communication path connecting the first controller and the first interface in a first power mode, the first controller being in an operation state when the controller is in the first power mode; and form a second communication path connecting the second controller and the first interface without via the first controller in a second power mode, the first controller being in an stop state when the controller is in the second power mode.

According thereto, the first controller operates in the first power mode, whereas the first controller does not operate in the second power mode.

Accordingly, in the first power mode in which the operating power is fed to the first controller, the first controller can perform necessary communication with the first external device via the interface, and even in the second power mode in which the feeding of the operating power to the first controller is stopped, it is possible to perform necessary communication with the first external device. As a result, it is possible to more securely perform communication relating to the power exchange to and from the external device via the interface.

According to the disclosure, it is possible to securely perform communication relating to the power exchange to and from the external device.

DETAILED DESCRIPTION

Hereinafter, illustrative embodiments of the disclosure will be described in detail with reference to the accompanying drawings.

<Electrical Configuration of MFP>

Figure 1:
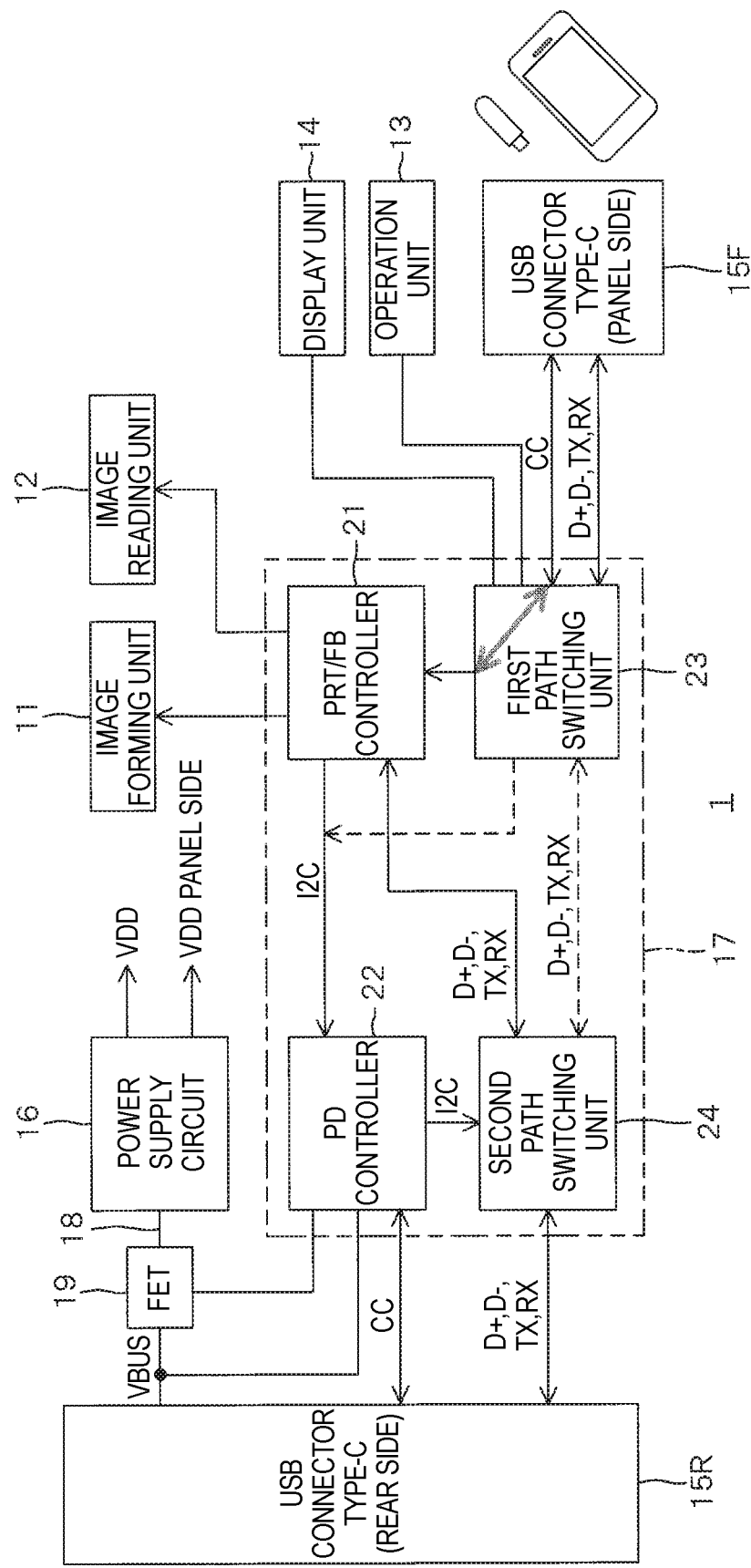
FIG. 1 is a block diagram of an electrical configuration of an MFP in accordance with an illustrative embodiment of the disclosure, depicting a state of a normal mode.
Figure 2:
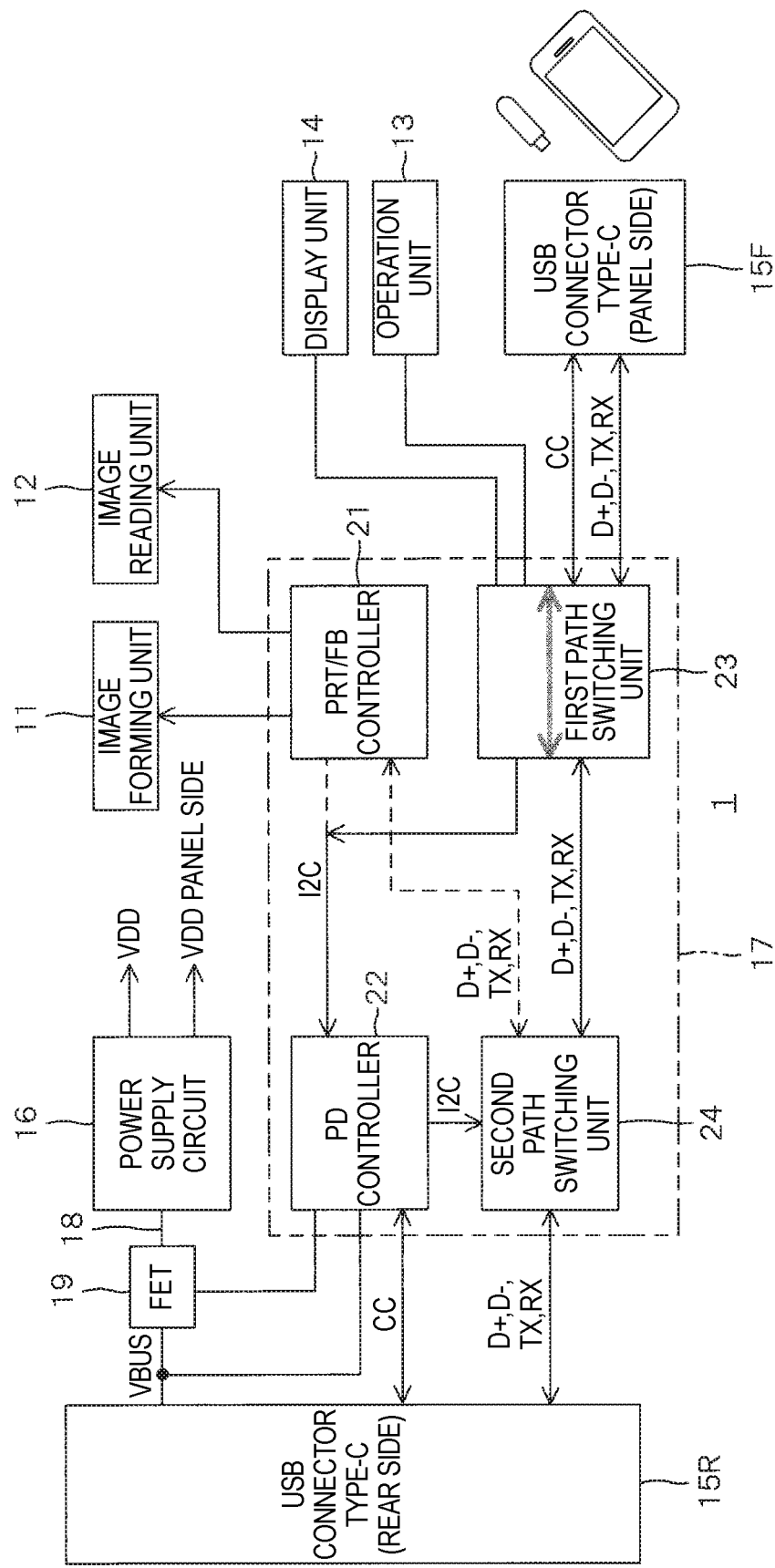
FIG. 2 is a block diagram of the electrical configuration of the MFP, and depicting a state of a power saving mode.

An MFP (Multi-Function Peripheral) 1 shown in FIGS. 1 and 2, which is an example of the image processing apparatus, includes an image forming unit 11, an image reading unit 12, an operation unit 13, a display unit 14, a first USB (Universal Serial Bus) connector 15F, a second USB connector 15R, a power supply circuit 16 and a control unit 17.

The image forming unit 11 (an example of the processing unit) is provided in a housing configuring an outer shell of the MFP 1. The image forming unit 11 is configured to print a color image or a monochrome image on a sheet such as a print sheet that is to be conveyed one by one along a conveyance path in the housing. A printing method thereof may be an electrophotographic method or an inkjet method.

The image reading unit 12 includes an image sensor, an AFE (Analog Front End), and the like. In the image reading unit 12, an image is read by the image sensor, so that an analog image signal is output from the image sensor and the analog image signal is converted into digital image data by the AFE.

The operation unit 13 and the display unit 14 are provided on a front surface of the housing, for example. The operation unit 13 and the display unit 14 are individually provided but may configure a touch panel. The display unit 14 configuring a touch panel has a liquid crystal monitor and is configured to display a variety of information and images such as an operation key and the like. When a user pushes (touches) the operation key displayed on the display unit 14, the operation thereof is received by the operation unit 13, so that a signal (data) corresponding to a content of the operation is output from the operation unit 13. In the below, it is assumed that the operation unit 13 and the display unit 14 configure the touch panel.

The first USB connector 15F (an example of the first USB connection unit) is provided on the front surface (panel side) of the housing on which the operation unit 13 and the display unit 14 are provided. The second USB connector 15R (an example of the second USB connection unit) is provided on a rear surface (rear side) of the housing, for example. Both the first USB connector 15F and the second USB connector 15R are Type-C receptacles (female) and are arranged so that plug (male) receiving ports are exposed to an outside from the housing. The first USB connector 15F and the second USB connector 15R include a VBUS terminal, a D+ communication terminal, a D− communication terminal, a TX transmission terminal, a RX receiving terminal, a CC (Configuration Channel) terminal and the like, respectively.

The power supply circuit 16 has a plurality of output terminals, and one of the output terminals is connected to the VBUS terminal of the second USB connector 15R via a power feeding line 18. The power feeding line 18 is provided with a switching element 19. The switching element 19 is configured by an N-channel type MOSFET, for example, in which a drain terminal is connected to the power feeding line 18 and a source terminal is earthed via a resistance. The switching element 19 is configured to perform a switching operation (on/off) by a voltage to be input to a gate terminal. Also, another one of the output terminals is connected to the VBUS terminal of the first USB connector 15F via a power feeding line (not shown) having a switching element provided thereto, like the power feeding line 18.

The control unit 17 includes a PRT/FB (Printer/Flatbed) controller 21 (an example of the first controller) configured to control the image forming unit 11 and the image reading unit 12, a PD (Power Delivery) controller 22 (an example of the second controller) configured to control power feeding to each unit from the power supply circuit 16, and a first path switching unit 23 (Direction Switch) and a second path switching unit 24 configured to switch a communication path between the first USB connector 15F and the second USB connector 15R. The PRT/FB controller 21, the PD controller 22, the first path switching unit 23 and the second path switching unit 24 are connected each other in serial communication by an IC (Integrated Circuit), for example I2C (Inter-Integrated Circuit) method. The PRT/FB controller 21 has a function of controlling communication with an external device connected to the first USB connector 15F, too. Also, the PD controller 22 has a function of controlling communication with an external device connected to the second USB connector 15R, too.

<Mode Shift Processing>

The MFP 1 has set, as power consuming modes, a normal mode (an example of the first power mode) and a power saving mode (an example of the second power mode) therein.

When a power supply of the MFP 1 becomes on from an off state, the power consuming mode becomes the normal mode. In the normal mode, alternating current power that is fed from a commercial power supply AC to a power supply substrate (not shown) is converted into direct current power, and the direct current power is fed to each unit including the PRT/FB controller 21 and the PD controller 22 via the power supply circuit 16.

Figure 3:
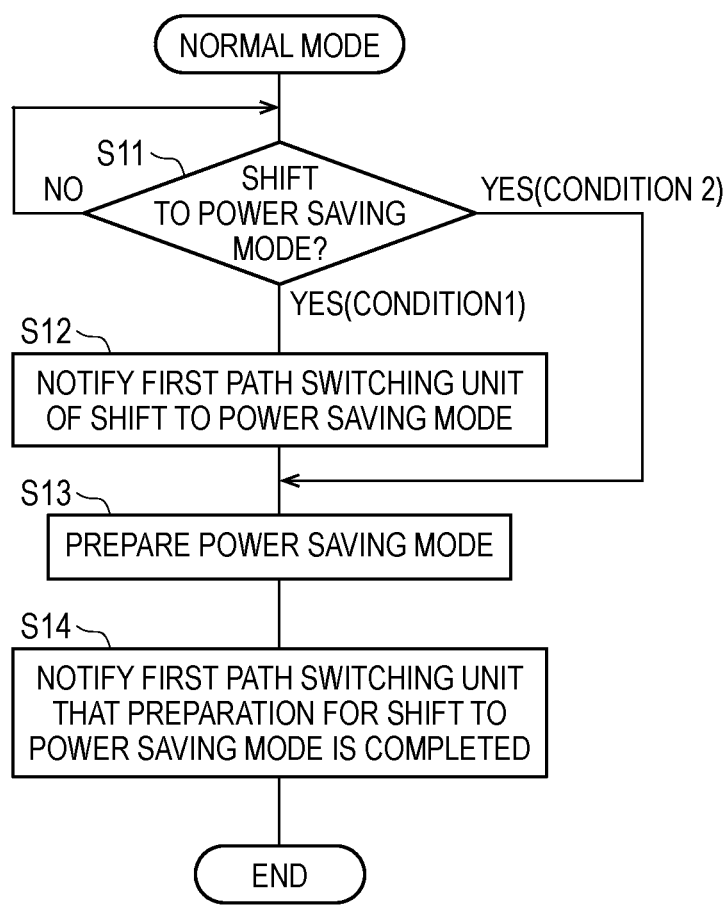
FIG. 3 is a flowchart depicting processing in the normal mode that is to be executed by a PRT/FB controller.

In the normal mode, the PRT/FB controller 21 is configured to execute the normal mode processing shown in FIG. 3 in the normal mode. In the processing in the normal mode shown in FIG. 3, the PRT/FB controller 21 determines whether a condition for shift from the normal mode to the power saving mode is fulfilled (S11).

A power saving shift condition 1, which is one of conditions for shift from the normal mode to the power saving mode, is a condition that predetermined time has elapsed from the latest time of an end time of a final operation on the operation unit 13, an end time of a final printing operation and an end time of a final image reading operation. When the power saving shift condition 1 is fulfilled, the PRT/FB controller 21 notifies the first path switching unit 23 of shift to the power saving mode (S12). Then, the RT/FB controller 21 starts to prepare the shift from the normal mode to the power saving mode (S13).

A power saving shift condition 2, which is another one of the conditions for shift from the normal mode to the power saving mode, is a condition that a shift notification to the power saving mode has been issued from the first path switching unit 23. When the power saving shift condition 2 is fulfilled, the PRT/FB controller 21 starts to prepare the shift from the normal mode to the power saving mode, in response to the fulfillment (S13). When preparing the shift to the power saving mode, the PRT/FB controller 21 moves data, which is held in a volatile memory embedded in the PRT/FB controller 21, to a non-volatile memory. Also, the PRT/FB controller 21 controls the power supply circuit 16 to interrupt the power feeding to the image forming unit 11, the image reading unit 12 and the display unit 14.

Thereafter, when the preparation for shift from the normal mode to the power saving mode is completed, the PRT/FB controller 21 notifies the first path switching unit 23 that the preparation for shift to the power saving mode is completed (S14).

Figure 4:
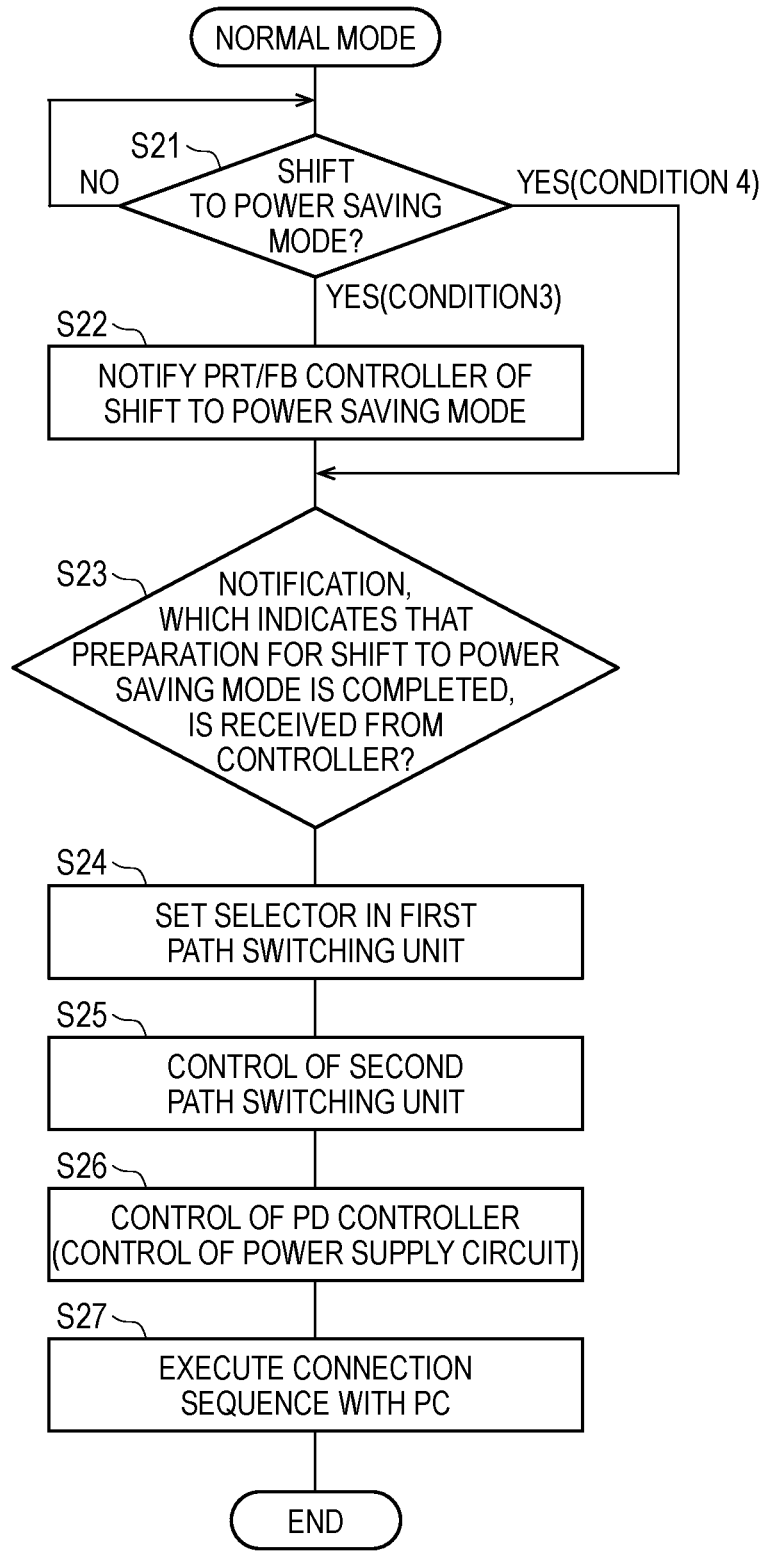
FIG. 4 is a flowchart depicting processing in the normal mode that is to be executed by a first path switching unit.

Meanwhile, in the normal mode, the first path switching unit 23 executes processing in the normal mode shown in FIG. 4 In the processing in the normal mode shown in FIG. 4, the first path switching unit 23 determines whether the condition for shift from the normal mode to the power saving mode is fulfilled (S21).

A power saving shift condition 3, which is one of the conditions for shift from the normal mode to the power saving mode, is a condition that an instruction for shift to the power saving mode has been input by an operation of the operation unit 13. When the power saving shift condition 3 is fulfilled, the first path switching unit 23 notifies the PRT/FB controller 21 of the shift to the power saving mode (S22). Then, the first path switching unit 23 determines whether the notification, which indicates that the preparation for shift to the power saving mode is completed, is received from the PRT/FB controller 21 (S23).

A power saving shift condition 4, which is another one of the conditions for shift from the normal mode to the power saving mode, is a condition that a shift notification to the power saving mode has been issued from the PRT/FB controller 21. When the power saving shift condition 4 is fulfilled, the first path switching unit 23 determines whether the notification, which indicates that the preparation for shift to the power saving mode is completed, is received from the PRT/FB controller 21 (S23).

Thereafter, the first path switching unit 23 sets a selector provided in the first path switching unit 23 (S24). The selector is for switching a communication destination with the first path switching unit 23. At this time, the first path switching unit 23 makes a setting of switching a communication destination with the first path switching unit 23 from the PRT/FB controller 21 to the PD controller 22 and second path switching unit 24. Thereby, as shown in FIG. 2, communication can be performed between an external device connected to the first USB connector 15F and an external device connected to the second USB connector 15R, and also communication can be performed between the PD controller 22 and the first path switching unit 23. After the selector is set, the PRT/FB controller 21 controls the power supply circuit 16 so that the power feeding to the PRT/FB controller 21 is to be shut off.

In the power saving mode, the first path switching unit 23 starts to control the second path switching unit 24 for communication between the external device connected to the first USB connector 15F and the external device connected to the second USB connector 15R (S25).

Also, the first path switching unit 23 starts to control the PD controller 22 for power feeding (power delivery) to the external device connected to the first USB connector 15F (S26).

Then, when an external device, which is a host of the USB communication, for example, a PC (Personal Computer) is connected to the second USB connector 15R, the first path switching unit 23 executes a sequence for connection with the external device (S27).

Figure 5:
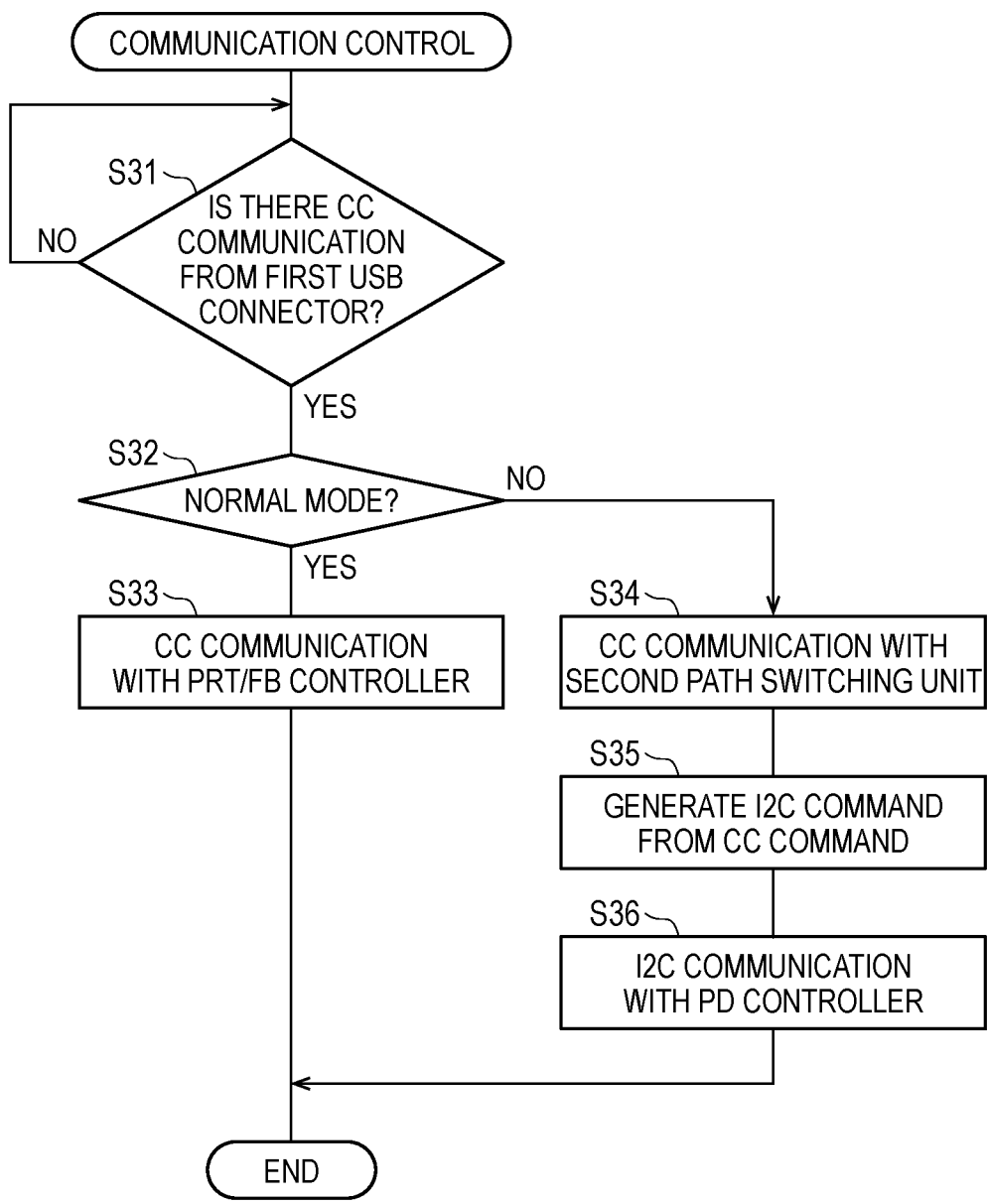
FIG. 5 is a flowchart depicting communication control processing that is to be executed by the first path switching unit.

Also, the first path switching unit 23 executes communication control processing shown in FIG. 5. In the communication control processing, when there is communication (CC communication) via the CC terminal of the first USB connector 15F from the external device connected to the first USB connector 15F (S31: YES), the first path switching unit 23 determines whether the current mode is the normal mode (S32).

When the current mode is the normal mode (S32: YES), the first path switching unit 23 transmits and receives a CC signal to and from the PRT/FB controller 21 because the communication destination of the first path switching unit 23 has been set to the PRT/FB controller 21 (S33). Then, when an external device, which is a device of the USB communication, for example, a USB memory, a smart phone or the like is connected to the first USB connector 15F, the first path switching unit 23 transmits and received data to and from the external device. Also, when a request for power feeding is issued from the external device, the first path switching unit 23 transmits the request for power feeding to the PRT/FB controller 21. The PRT/FB controller 21 having received the request transmits an I2C command to the PD controller 22, and the PD controller 22 turns on the power supply circuit 16 and the switching element provided to the power feeding line for interconnecting the power supply circuit 16 and the first USB connector 15F, so that the power is fed to the external device connected to the first USB connector 15F.

When the current mode is not the normal mode, i.e., when the current mode is the power saving mode (S32: NO), the first path switching unit 23 transmits and receives a CC signal to and from the second path switching unit 24 because the communication destination of the first path switching unit 23 has been set to the PD controller 22 and the second path switching unit 24 (S34). Thereby, when the external device, which is a device of the USB communication, is connected to the first USB connector 15F and the external device, which is a host of the USB communication, is connected to the second USB connector 15R, the second path switching unit 24 controls communication between the external device connected to the first USB connector 15F and the external device connected to the second USB connector 15R. Also, when a request for power feeding is issued from the external device connected to the first USB connector 15F, the first path switching unit 23 generates an I2C command of the power feeding (S35). Then, the first path switching unit 23 transmits the I2C command to the PD controller 22 (S36), and the PD controller 22 turns on the power supply circuit 16 and the switching element provided to the power feeding line for interconnecting the power supply circuit 16 and the first USB connector 15F, so that the power is fed to the external device connected to the first USB connector 15F.

Figure 6:
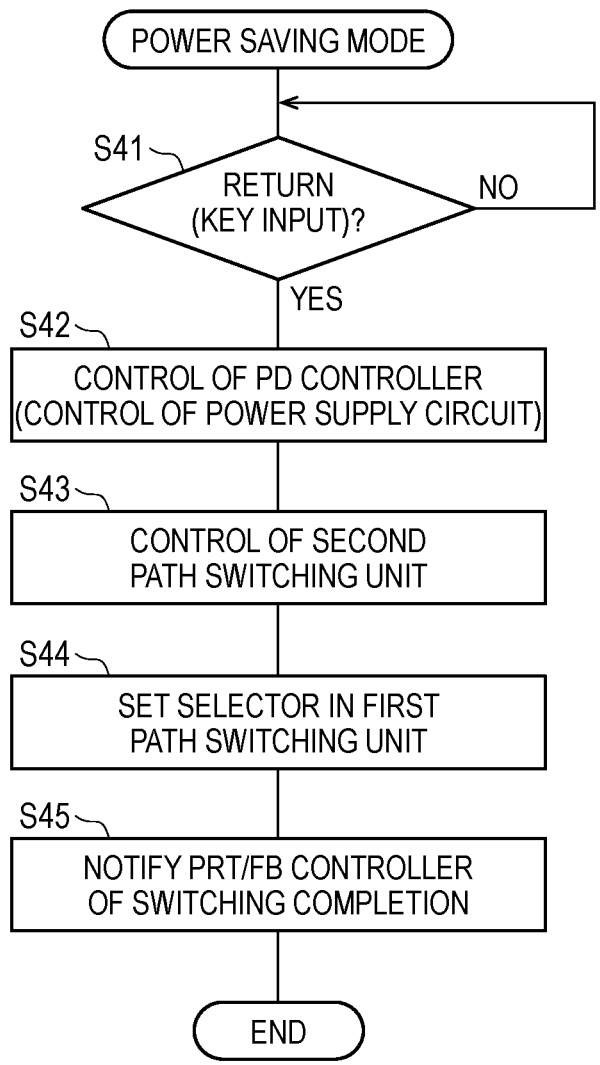
FIG. 6 is a flowchart depicting processing in the power saving mode that is to be executed by the first path switching unit.
Figure 7:
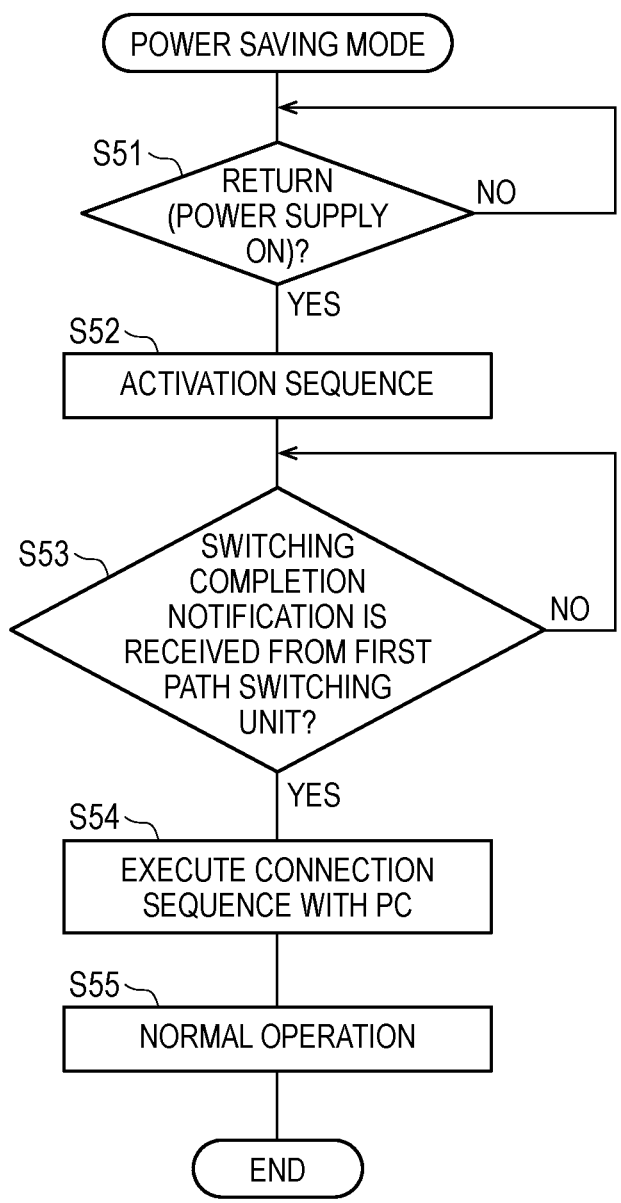
FIG. 7 is a flowchart depicting processing in the power saving mode that is to be executed by the PRT/FB controller.

Also, in the power saving mode, the first path switching unit 23 executes processing in the power saving mode shown in FIG. 6. In the processing in the power saving mode shown in FIG. 6, the first path switching unit 23 determines whether a key input for instructing return from the power saving mode to the normal mode is made by an operation through the operation unit 13 (S41).

When there is a key input for instructing the return (S41: YES), the first path switching unit 23 controls the power supply circuit 16 via the PD controller 22 (S42), and starts the power feeding from the power supply circuit 16 to the image forming unit 11, the image reading unit 12, the display unit 14 and the PRT/FB controller 21. Also, the first path switching unit 23 ends the control of communication between the external device connected to the first USB connector 15F and the external device connected to the second USB connector 15R, which is performed by the second path switching unit 24 (S43).

Then, the first path switching unit 23 switches the communication destination of the first path switching unit 23 from the PD controller 22 and the second path switching unit 24 to the PRT/FB controller 21, in accordance with the setting of the selector (S44). Then, the first path switching unit 23 notifies the PRT/FB controller 21 that the switching of the communication destination has been completed (S45).

In the power saving mode, when the power feeding from the power supply circuit 16 is resumed (S51: YES), the PRT/FB controller 21 executes an activation sequence for return (S52).

Then, the notification, which indicates that the switching of the communication destination has been completed, is received from the first path switching unit 23 (S53: YES), and if the external device, which is a host of the USB communication, is connected to the second USB connector 15R, the PRT/FB controller 21 executes a sequence for connection with the external device (S54). Thereafter, the PRT/FB controller 21 performs the usual operations.

As described above, in the normal mode, the PRT/FB controller 21 operates, and in the power saving mode, the PRT/FB controller 21 does not operate.

In the normal mode, the communication path is formed between the PRT/FB controller 21 and the first path switching unit 23 by the first path switching unit 23, so that the PRT/FB controller 21 and the first USB connector 15F are communicatively connected. For this reason, the PRT/FB controller 21 operates, so that the PRT/FB controller 21 and the external device can perform necessary communication via the first USB connector 15F. In the power saving mode, the PRT/FB controller 21 does not operate. Therefore, even when the PRT/FB controller 21 and the first USB connector 15F are communicatively connected, the PRT/FB controller 21 and the first external device cannot perform necessary communication. Therefore, in the power saving mode, the communication path is formed between the first path switching unit 23 and the PD controller 22 and second path switching unit 24 by the first path switching unit 23, so that the second path switching unit 24 and the first USB connector 15F are communicatively connected without via the PRT/FB controller 21. For this reason, the second path switching unit 24 operates, so that the second path switching unit 24 and the first external device can perform necessary communication via the first USB connector 15F.

Accordingly, in the normal mode in which the operating power is fed to the PRT/FB controller 21, the PRT/FB controller 21 can perform necessary communication with the external device connected to the first USB connector 15F, and even in the power saving mode in which the feeding of the operating power to the PRT/FB controller 21 is stopped, it is possible to perform necessary communication with the external device connected to the first USB connector 15F. As a result, it is possible to more securely perform communication relating to the power exchange (power transmission and reception) to and from the external device via the first USB connector 15F.

MODIFIED EMBODIMENTS

Although the illustrative embodiment of the disclosure has been described, the disclosure can be implemented in other forms.

For example, the power supply circuit 16 may include a switching power supply and a DC/DC converter, in addition to the configuration where the power (bus power) is fed to the external devices connected to the first USB connector 15F and the second USB connector 15R. The switching power supply is for converting an alternating current voltage, which is to be supplied from the commercial alternating current power supply AC via the pair of power feeding lines, into a direct current voltage, and includes a diode bridge, a transformer, a rectification smoothing circuit, and the like. The switching power supply is configured to output a direct current voltage of 24V, for example. The DC/DC converter includes a linear regulator and the like, and is configured to drop the direct current voltage to be output from the switching power supply.

The disclosure is not limited to the MFP 1, and may be applied to a single functional printer in which the image forming unit 11 is provided but the image reading unit 12 is not provided, and a single functional scanner in which the image forming unit 11 is not provided but the image reading unit 12 is provided, too.

Also, the above configuration can be diversely design-changed within the scope of the claims.

What is claimed is:

1. An image processing apparatus comprising:
   a power supply;
   a first interface; and
   a controller comprising:
      a first controller configured to control communication with a first external device via the first interface, the communication comprising communication relating to image data and communication relating to power exchange to and from the first external device;
      a second controller configured to control power fed from the power supply to the first external device connected to the first interface, based on information obtained by the communication relating to power exchange to and from the first external device; and
      a first path switch configured to:
         form a first communication path connecting the first controller and the first interface in a first power mode, the first controller being in an operation state when the controller is in the first power mode; and
         form a second communication path connecting the second controller and the first interface without via the first controller in a second power mode, the first controller being in an stop state when the controller is in the second power mode.

2. The image processing apparatus according to claim 1, wherein the second controller is configured to switch a power feeding amount from the power supply.

3. The image processing apparatus according to claim 2, wherein the second controller comprises a power delivery (PD) controller.

4. The image processing apparatus according to claim 1, further comprising:
   a second interface connectable to a second external device,
   wherein the second controller is configured to control power feeding from the power supply to the second external device via the second interface, based on the information obtained by the communication relating to power exchange.

5. The image processing apparatus according to claim 4, wherein the power supply is configured to relay exchange of bus power between the first external device via the first interface and the second external device via the second interface.

6. The image processing apparatus according to claim 4, wherein the controller further comprises:
   a second path switch communicatively connectable to the second controller, the second path switch being configured to:
      perform communication with the second external device via the second interface;
      form a third communication path connecting the second path switch and the first controller in the first power mode; and
      form a fourth communication path connecting the second path switch and the first path switch in the second power mode.

7. The image processing apparatus according to claim 1, wherein based on the first power mode being switched to the second power mode, the first controller is configured to notify the first path switch that the first power mode is switched to the second power mode.

8. The image processing apparatus according to claim 7, wherein based on being notified that the first power mode is switched to the second power mode, the first path switch is configured to be switched from a state in which the first communication path is formed to a state in which the second communication path is formed and control the power supply via the second controller to stop power feeding from the power supply to the first controller.

9. The image processing apparatus according to claim 8, further comprising:
an operation device configured to receive an operation,
wherein based on receiving an operation through the operation device in a state where the power feeding to the first controller is stopped, the first path switch is configured to be switched from the state in which the second communication path is formed to the state in which the first communication path is formed and notify the first controller of said switching to the state in which the first communication path is formed.

10. The image processing apparatus according to claim 8, wherein in a case the second external device connected to the second interface acts as a host of the image processing apparatus, the first path switch is configured to:
be switched from the state where the first communication path is formed to the state where the second communication path is formed; and then
start a sequence for connection with the second external device.

11. The image processing apparatus according to claim 1, further comprising:
a processor configured to perform processing on image data,
wherein the first controller is configured to control the processing by the processor in the first power mode.

12. The image processing apparatus according to claim 1, wherein the first interface is a USB (Universal Serial Bus) interface.

13. The image processing apparatus according to claim 4, wherein the second interface is a USB (Universal Serial Bus) interface.

14. The image processing apparatus according to claim 4, wherein the first interface is a USB (Universal Serial Bus) interface, and
wherein the second interface is a USB (Universal Serial Bus) interface.

15. The image processing apparatus according to claim 1, wherein the first path switch is configured to selectively form the first communication path and the second communication path by switching a communication destination with the first interface to the first controller or to the second controller.

* * * * *